United States Patent [19]
Bergmann et al.

[11] Patent Number: 5,850,888
[45] Date of Patent: Dec. 22, 1998

[54] VARIABLE-RATIO HYDRAULIC STEERING SYSTEM

[75] Inventors: Erhard Bergmann, Mirow; Manfred Schildmann; Gerhard Voss, both of Parchim, all of Germany

[73] Assignee: Hydraulik Nord GMBG, Parchim, Germany

[21] Appl. No.: 702,708

[22] PCT Filed: Feb. 23, 1995

[86] PCT No.: PCT/DE95/00246

§ 371 Date: Sep. 3, 1996

§ 102(e) Date: Sep. 3, 1996

[87] PCT Pub. No.: WO95/23723

PCT Pub. Date: Sep. 8, 1995

[30] Foreign Application Priority Data

Mar. 4, 1994 [DE] Germany ............. P 44 07 308.9

[51] Int. Cl.[6] .................................. B62A 5/06
[52] U.S. Cl. .................... 180/406; 180/441; 180/442
[58] Field of Search ................... 180/403, 406, 180/441, 442; 60/384; 91/375 R, 47, 51, 417 R

[56] References Cited

U.S. PATENT DOCUMENTS

| | | | |
|---|---|---|---|
| 4,131,177 | 12/1978 | Goodbary et al. | 60/405 |
| 4,470,260 | 9/1984 | Miller et al. | 60/384 |
| 4,838,314 | 6/1989 | Gage | 60/384 |
| 4,942,935 | 7/1990 | Lech | 60/384 |
| 5,050,696 | 9/1991 | McGovern et al. | 180/152 |
| 5,056,311 | 10/1991 | Tischer | 60/384 |

FOREIGN PATENT DOCUMENTS

| | | |
|---|---|---|
| 99758 | 7/1971 | Germany . |
| 2140569 | 2/1973 | Germany . |
| 2228531 | 7/1982 | Germany . |

*Primary Examiner*—Brian L. Johnson
*Assistant Examiner*—Gary Savitt
*Attorney, Agent, or Firm*—Horst M. Kasper

[57] ABSTRACT

The invention changes over to another steering ratio automatically and very safely on the transition from servo to emergency operation. In the steering system, only a few of the lines (13) link the metering pump (10) to one of the cylinder connections (7, 8) and in each of the other lines (13') there is a changeover unit (16) which also links the lines (13) to the cylinder connections (7, 8) or the delivery connection (6) depending on the method of operation. These steering systems are used in mobile systems, especially slow-moving vehicles.

17 Claims, 3 Drawing Sheets

VARIABLE-RATIO HYDRAULIC STEERING SYSTEM

BACKGROUND OF THE INVENTION

The invention relates to a hydraulic steering system.

Such steering systems are employed in particular in slow-moving vehicles with high axle loads.

Steering systems of this kind have been known for a long time and are employed in a multitude of embodiments.

The steering systems comprise mainly a rotary slide control valve and an orbital displacement system. The rotary slide control valve is formed by an outer control sleeve, fitted into the casing, and an inner concentrically disposed control piston. The control piston is connected, on the one hand, by a gear hub to the steering wheel and, on the other hand, relatively movable by a pin connection to the control sleeve. The control sleeve is rigidly connected to the rotor gear wheel of the orbital displacement system with a pin connection and a drive shaft. The control piston is centered in its position by a way of a spring element relative to the control sleeve. The control piston and the control sleeve are rotatable relative to each other by a limited amount against the force of this spring element. A hydraulic connection exists between the rotary slide control valve and the orbital displacement system through commutator boreholes.

The hydraulic steering system is furnished with connections for a feed, for a return, and for two cylinder lines for the control cylinder.

These steering devices are characterized by a high volume of displacement without translation ratio between servo operation and emergency operation.

This means, however, that in case of a possible failure of the supply pump the steering system switches instantaneously to emergency operation, and that therefore all of the required steering power has to be supplied manually at the steering wheel. This is a safety risk in particular in road traffic.

Therefore, it has been a long-time endeavor to provide steering systems, which switch automatically to another translation ratio in the concrete situation of the change from servo operation to emergency operation.

Thus, the German printed patent document DE 22 28 531 C2 is known, which shows the possibility for changing the displacement volume for each rotation of the steering wheel.

This steering system is furnished with an orbital displacement system with two parallel-connected displacement units, wherein the movable gear wheels of the displacement unit are mechanically connected to each other by a gear shaft. Switching valves are disposed in the hydraulic connection lines between the two displacement units, wherein the switching valves connect the two displacement units in the presence of compression oil, i.e. in the servo steering operation, and render a displacement unit ineffective in emergency steering operation, i.e. in case of failure of the supply pump.

The number of the necessary rotations of the steering wheel for reaching a certain locking angle or steering lock of the steered wheels becomes necessarily higher based on the decreased displacement volume. However, the required steering power remains substantially constant in case of a corresponding construction of the steering and thus manageable by the operator of the vehicle.

However, the constructive expenditure and thus the cost expenditure is relatively large. Based on the complicated structure, the steering system is very much subject to interferences. Thus, the steering system does not eliminate the safety risk in road traffic.

A rotary piston machine has become known from the German printed patent document DE 21 40 569, which rotary piston machine operates in particular as an engine. The rotary slide control valve of the rotary piston machine is furnished with a switching device, wherein the switching device connects selectively each fourth of twelve valve openings of the outer control sleeve to the feed or to the discharge.

Thus, the rotary piston machine operates in one of the two operational stages with a decreased chamber volume on the pressure side and thus with a decreased torque and with an increased rotational speed. The switching device is operated manually.

This solution is unsuitable for steering devices because a manual operation of the switching device is completely unsuitable.

In addition, there is another safety risk, since the safety of the switching from servo operation to emergency operation depends on the continuous functional safety and readiness for operation of the switching device.

OBJECTS OF THE INVENTION

Therefore, there exists the object to provide a steering device of the recited kind which, in case of an emergency operation, switches automatically and with a high level of certainty to another translation ratio.

The invention eliminates the recited disadvantages of the state of the art. A substantial advantage is the high safety and certainty of the switching to a different translation ratio. Based on the presence of several switching units, it is only of little importance, if possibly one of the switching units fails, since in this case a change in translation ratio is also assured based on the remaining switching units, even if it is not the optimum translation ratio.

BRIEF DESCRIPTION OF THE INVENTION

The invention is further described in the following by way of two embodiments.

There is shown for this purpose:

FIG. 1: A first embodiment with a steering system in open-center construction

FIG. 2: A second embodiment with a steering system in open-center construction

FIG. 3: A third embodiment with a steering system in open-center construction.

DETAILED DESCRIPTION

Figure 1:
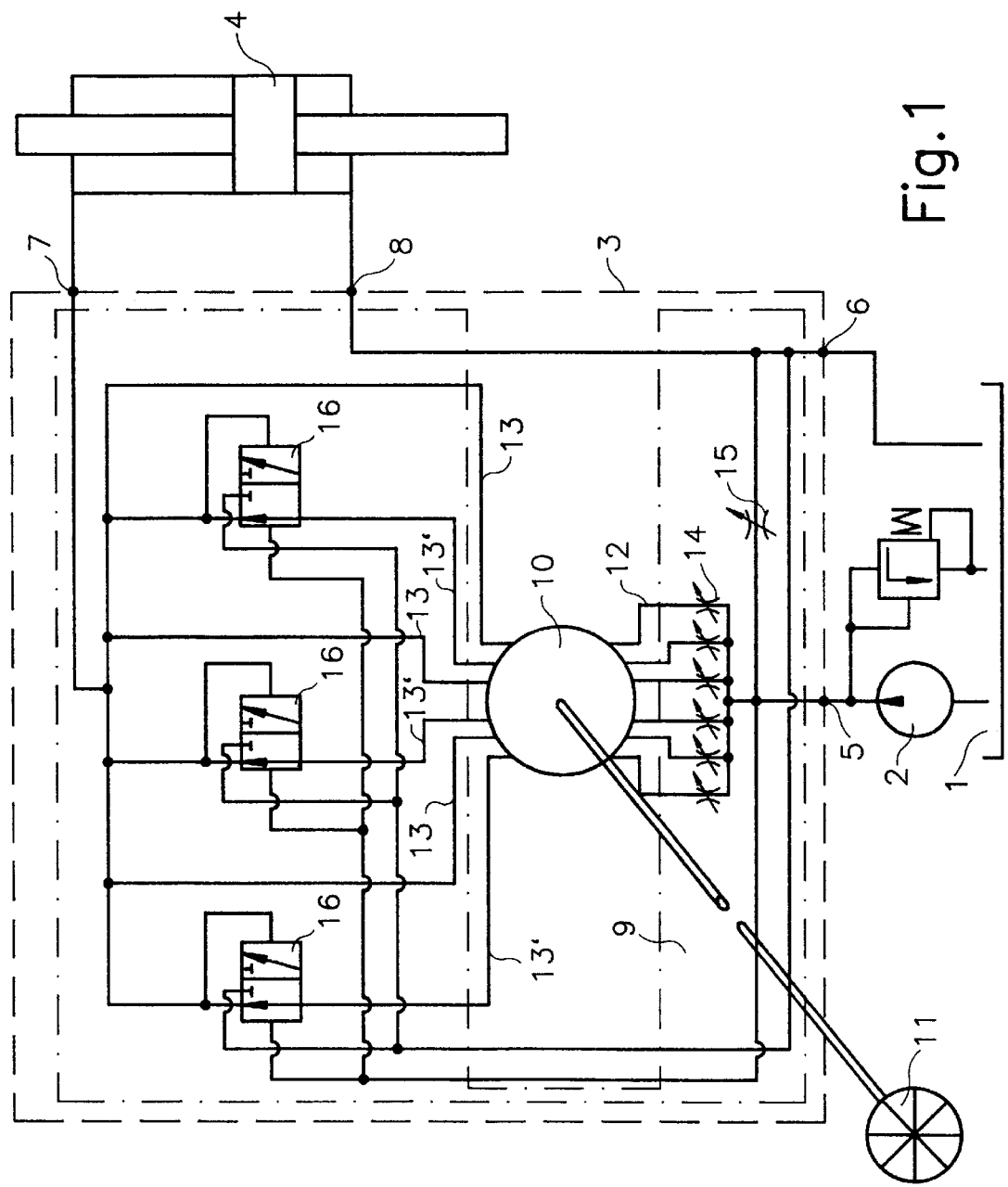

The hydraulic circuit is illustrated in simplified version for reasons of viewability and comprises substantially a tank 1, a supply pump 2, a steering device 3, and a control cylinder 4 acting on the wheels of the vehicle.

The steering device 3 is furnished with a feed connector 5, a discharge connector 6, and two cylinder connections 7 and 8. Main elements of the steering device 3 are a control valve 9 and a metering pump 10, operating according to the orbital principle, with an outer ring of, for example, seven teeth and with a runner gear wheel with then six teeth. The control valve 9 is fitted into a casing and is conventionally furnished with an inner control piston, controllable by a steering wheel 11, and an outer control sleeve, mechanically connected to the rotor of the metering pump 10. The control piston and the control sleeve are disposed concentrically to each other and are rotatable to a limited degree and against the force of a spring. The control piston is furnished with six parallel-acting lines 12, distributed uniformly at the circumference of the control piston. The lines 12 have a connection, on the one hand, to the feed connector 5 and, on the other hand, to the input side of the metering pump 10. The control piston is furnished with a total of six lines 13 and 13', wherein the lines 13 and 13', on the one hand, are connected with the output side of the metering pump and, on the other hand, to a cylinder connection 7 or 8. The six lines 12 form six adjustable input throttles 14 in cooperation with the channels of the control sleeve. A short-circuit path branches from the feed connector 5, disposed in front of the input throttles 14 of the control valve 9, to the discharge connector 6, in which a short-circuit throttle 15 is disposed, and which behaves inversely proportional to the input throttles 14.

According to the first embodiment according to FIG. 1, three lines 13 lead directly to the respective cylinder connection 7 or 8. In each case, an externally controlled switching unit 16 is disposed in the three remaining lines 13'. The switching unit 16 is preferably constructed as a 3 by 2-way valve with a second output-side connection to the discharge connector 6 or to the feed connector 5. The switching unit 16 is furnished with a hydraulic adjustment unit which, on the one hand, is connected to the feed line, disposed upstream relative to the metering pump 10 and, on the other hand, is connected to one of the lines 13 or 13', disposed downstream relative to the metering pump 10. Because of the higher pressure differential, the adjustment unit of the switching unit 16 is advantageously connected to one of the lines 13.

The switching units can also cooperate in a conventional way with different kinds of adjustment units, for example, with in each case an electrical adjustment unit.

It is further possible to dispose in each case an externally-controlled shut-off valve in the control line, connected to the line 13, of one or several switching units 16. The vehicle operator can preprogram with the externally-controlled shut-off valve the translation ratio during the switching from servo operation to emergency operation as required based on the blocking of the individual switching units 16.

Figure 2:
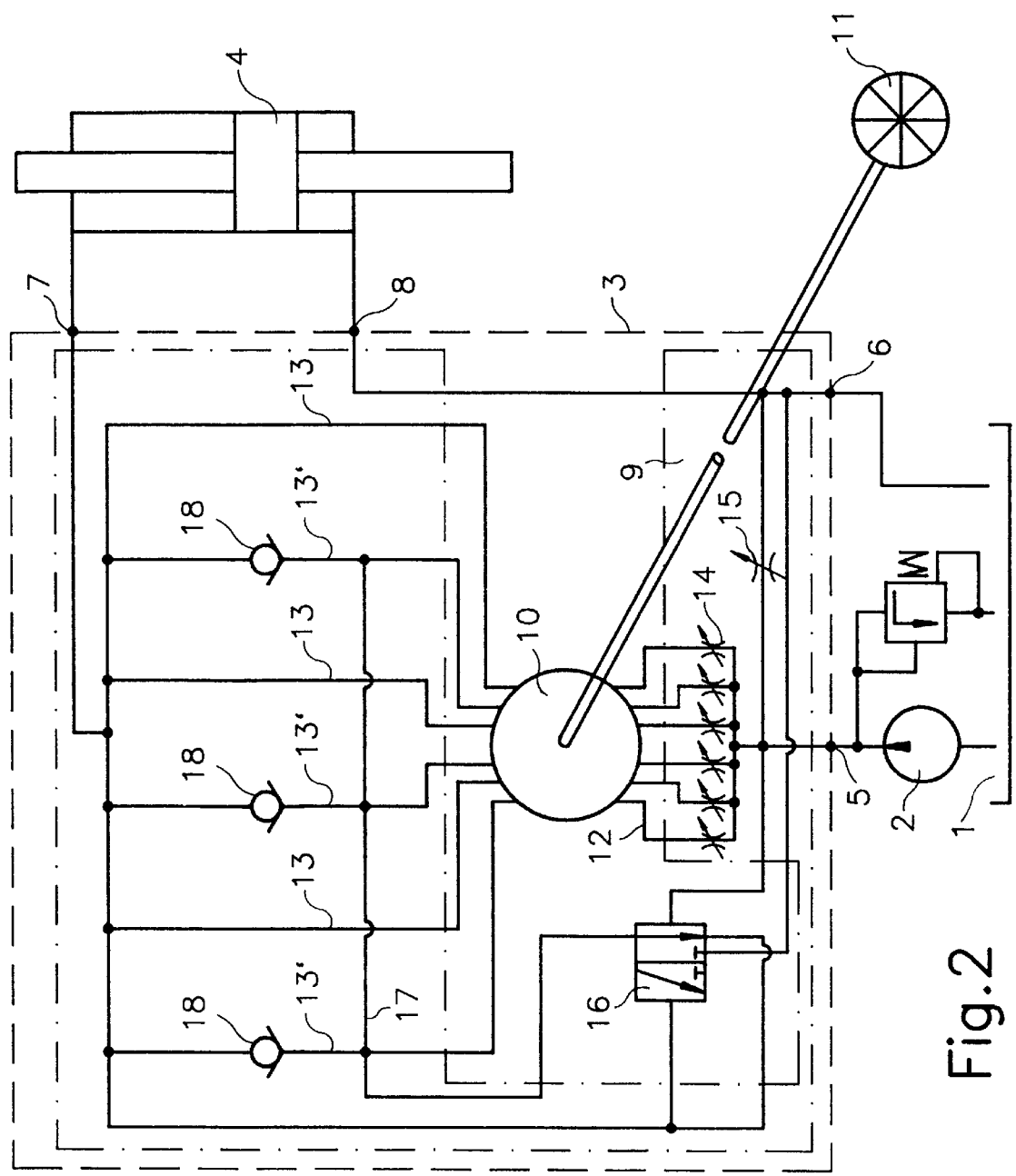

According to the second embodiment according to FIG. 2, a switching unit 16 is disposed outside of the lines 13', capable of being switched off, in such a way that a collector line 17 leads to one or several lines 13' on the input side, and that, as desired, in each case a connection is present to one of the cylinder connections 7 or 8 or to the discharge connector 6 on the output side.

The output side can also be connected to the feed connector 5 instead of being connected to the discharge connector 6. The adjustment unit of the switching unit 16 is again connected, on the one hand, to the feed line disposed in front of the metering pump 10 and, on the other hand, with one of the lines 13 or 13' disposed after the metering pump 10. Other kinds of adjustment units can be employed also in this case. A check valve 18, opening in the direction to the respective cylinder connection 7 or 8, and disposed downstream after a branch leading to the switching unit 16, is disposed in each line 13'.

Figure 3:
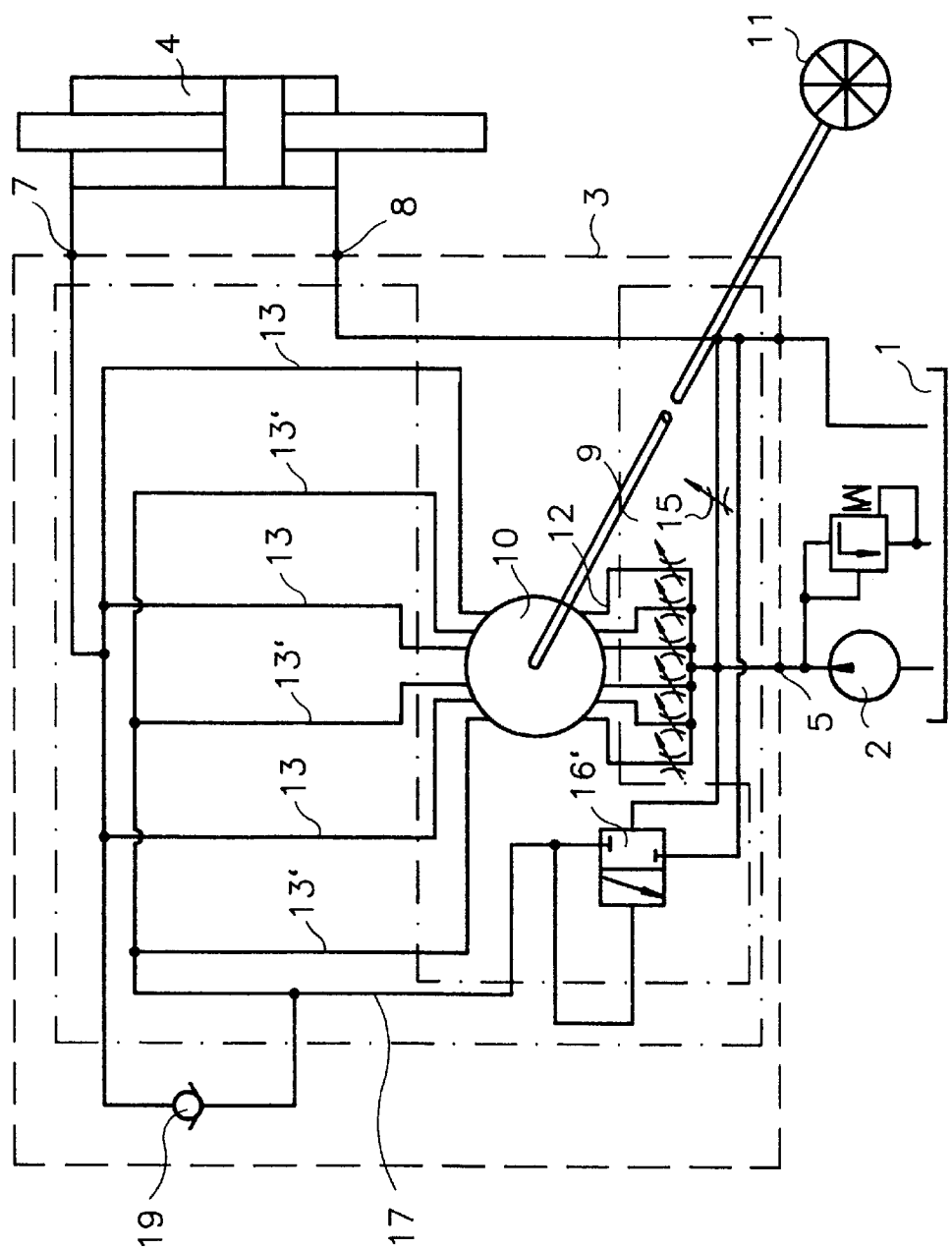

As shown in FIG. 3, it is also advantageous to employ a check valve 19, responsible for all lines 13', instead of the individual check valves 18. In this case, a 2 by 2-way valve is employed as a switching unit 16', wherein the 2 by 2-way valve can again be controlled in different ways.

In case of a non-actuated steering device 3, the control sleeve and the control piston of the control valve 9 are disposed in a neutral position such that all six input throttles 14 are closed and that the short-circuit throttle 15 is open. The oil, delivered by the supply pump 2, flows back unused through the short-circuit throttle 15 to the tank 1.

Upon actuation of the steering wheel 11, the control piston is deflected relative to the control sleeve and thus the input throttles 14 are opened. The oil passes into the metering pump 10, is metered in the metering pump 10, and is transported in a metered amount into the lines 13 and 13' leading to the control cylinder 4. The oil passes immediately to one of the cylinder connections 7 or 8 through the three lines 13 and thus to the control cylinder 4. In the other three lines 13', the oil passes in each case through the opened switching units 16, 16'.

The switching units 16, 16' connect the lines 13' to one of the cylinder connections 7 or 8 in servo operation, because the control pressure in front of the metering pump 10 surpasses the control pressure after the metering pump 10 by the amount of the flow pressure losses occurring between the two pressure monitoring positions.

The line at the feed connector 5 is without pressure in an emergency operation, that is when the supply pump 2 is switched off. The oil necessary for the steering device is in this case supplied solely through the manual activation of the steering wheel 11 and thus by the metering pump 10 and is fed to the control cylinder 4.

The oil passes in this case again through the three lines 13 directly to one of the cylinder connections 7 and 8 and thus to the control cylinder 4. The switching units 16, 16' are switched and connect the respective lines 13' to the discharge connector 6 or, alternatively, to the feed connector 5 because at this point in time the control pressure ratio of the pressure in front of the metering pump 10 and of the pressure after the metering pump 10 is inverse relative to the servo operation. In this case, only three of the six lines branching from the metering pump 10 are participating in the oil transfer, whereby the steering power is cut in half and the number of the required rotations at the steering wheel 11 for achieving the same deflection of the steered wheels is doubled relative to the servo operation.

We claim:

1. Hydraulic steering device with translation ratio, which comprises cylinder connections, a control valve, and a metering pump, wherein the control valve includes a control piston, controllable by a steering wheel, and a control sleeve, mechanically connected to a rotor of the metering pump, and wherein the control piston and the control sleeve are furnished with channels cooperating and communicating with each other and with the metering pump, and wherein the metering pump has several displacement chambers, of which displacement chambers several are continuously connected to one of the cylinder connections, and the remaining displacement chambers are connected by a switching unit to either one of the cylinder connections or to a discharge connector, characterized in that a metering pump (10) is employed which has exclusively parallel-disposed displacement chambers with first and second lines (13, 13') of which first lines (13). one or several of the first lines (13), however at the most one less than the number of lines present, connect the metering pump (10) directly to one of the cylinder connections (7, 8), wherein the switching unit (16) is coordinated to the remaining second lines (13'), and wherein an adjustment unit of the switching unit (16), on the one hand, is subjected to the pressure present upstream of the metering pump (10), in the position connecting the metering pump (10) to one of the cylinder connections (7, 8) and, on the other hand, to the pressure present downstream of the metering pump (10), in the position connecting the metering pump (10) to the discharge connector (6) or to a feed connector (5).

2. Hydraulic steering device according to claim 1, characterized in that the adjustment unit of the switching unit 16 is subjected to the pressure prevailing in the first lines (13).

3. Hydraulic steering device according to claim 2, characterized in that a switching unit (16) is coordinated to each second line (13').

4. Hydraulic steering unit according to claim 3, characterized in that three second lines (13') are provided.

5. Hydraulic steering unit according to claim 4, characterized in that in each case an externally-controlled shut-off valve is disposed in the control line of one or several switching units (16), wherein the control line is subjected to the pressure present downstream of the metering pump (10).

6. Hydraulic steering device according to claim 2, characterized in that the switching unit (16, 16') is disposed outside of the second lines (13'), which are disconnectable, and is connected on the input side with a collector line (17) to the other second lines (13'), and wherein a first check valve (18), opening in direction to one of the cylinder connections (7, 8) and disposed downstream after the branch leading to the switching unit (16, 16'), is disposed in each of the second lines (13').

7. Hydraulic steering unit according to claim 2, characterized in that the switching unit (16') is disposed outside of the second lines (13'), which are disconnectable wherein the switching unit (16') is connected on the input side with a collector line (17) to the other second lines (13'), and wherein a second check valve (19) is coordinated to all first lines (13) in place of a first check valve (18).

8. Hydraulic steering device according to claim 6, characterized in that the switching unit (16, 16') is furnished with a pneumatic adjustment unit.

9. Hydraulic steering device according to claim 6, characterized in that the switching unit (16, 16') is furnished with an electrical adjustment unit.

10. Hydraulic steering device according to claim 6, characterized in that the switching unit (16, 16') is furnished with an electromagnetic adjustment unit.

11. Hydraulic steering device according to claim 6, characterized in that the switching unit (16, 16') is furnished with a mechanical adjustment unit.

12. Hydraulic steering device according to claim 11, characterized in that the mechanical adjustment unit is furnished externally controlled.

13. Hydraulic steering device according to claim 5, characterized in that the switching units (16) are furnished with pneumatic adjustment units.

14. Hydraulic steering device according to claim 5, characterized in that the switching units (16) are furnished with electrical adjustment units.

15. Hydraulic steering device according to claim 5, characterized in that the switching units (16) are furnished with electro-magnetic adjustment units.

16. Hydraulic steering device according to claim 5, characterized in that the switching units (16) are furnished with mechanical adjustment units.

17. Hydraulic steering device according to claim 16, characterized in that the mechanical adjustment units are furnished externally controlled.

* * * * *